(12) United States Patent  
McDuffie White

(10) Patent No.: US 7,136,090 B1  
(45) Date of Patent: Nov. 14, 2006

(54) COMMUNICATIONS SYSTEM

(75) Inventor: Peter McDuffie White, Dallas, TX (US)

(73) Assignee: Teleportec, Inc., Dallas, TX (US)

( * ) Notice: Subject to any disclaimer, the term of this patent is extended or adjusted under 35 U.S.C. 154(b) by 105 days.

(21) Appl. No.: 10/049,253

(22) PCT Filed: Jul. 24, 2000

(86) PCT No.: PCT/GB00/02856

§ 371 (c)(1),  
(2), (4) Date: Feb. 8, 2002

(87) PCT Pub. No.: WO01/11880

PCT Pub. Date: Feb. 15, 2001

(30) Foreign Application Priority Data

Aug. 10, 1999 (GB) .................................... 9918704  
May 26, 2000 (GB) .................................... 0012732

(51) Int. Cl.  
*H04N 7/14* (2006.01)

(52) U.S. Cl. ............................... 348/14.16; 348/14.08

(58) Field of Classification Search .. 348/14.01–14.02, 348/14.07–14.09, 14.12–14.16, 782–788; 351/209–210; 353/28–34, 71–73, 77–79; 370/260–261; 345/753; 709/204  
See application file for complete search history.

(56) References Cited

U.S. PATENT DOCUMENTS

| | | | |
|---|---|---|---|
| 4,232,939 A | 11/1980 | Kikuchi | |
| 4,298,246 A | 11/1981 | Iwamura | |
| 4,309,073 A | 1/1982 | Nishimura et al. | |
| 4,558,922 A | 12/1985 | Smith | |
| 4,732,441 A | 3/1988 | Cheng | |
| 4,738,522 A | 4/1988 | Lunde et al. | |
| 4,805,895 A | 2/1989 | Rogers | |
| 4,852,988 A * | 8/1989 | Velez et al. | .................. 351/210 |
| 4,965,819 A | 10/1990 | Kannes | |
| 5,061,061 A | 10/1991 | Robley et al. | |
| 5,117,285 A * | 5/1992 | Nelson et al. | ........... 348/14.16 |
| 5,194,955 A | 3/1993 | Yoneta et al. | |
| 5,221,937 A | 6/1993 | Machtig | |
| 5,255,028 A | 10/1993 | Biles | |

(Continued)

FOREIGN PATENT DOCUMENTS

WO WO 94/30016 12/1994

(Continued)

OTHER PUBLICATIONS 41.2:Multiscreen Display Method for Expanding Steroscopic Viewing Space, pp. 905-908, Komatsu et al., May 16, 1993.*

(Continued)

*Primary Examiner*—Melur Ramakrishnaiah  
(74) *Attorney, Agent, or Firm*—Slater & Matsil, L.L.P.

(57) ABSTRACT

An arrangement is provide for displaying a life-size live image of a person from a remote location in a three dimensional setting in a home location while providing the person in the remote location with a telepresence of the home location through the invention comprising: a video presentation system for displaying a person on a black background; a two way mirror for viewing both the setting and the superimposed video image of the person; a video camera or pair of cameras positioned in line with the eyes of the superimposed image of the person; and a network connection between the home location and the remote location. Stereoscopic views may be used in conjunction with the two way mirror and a retroreflective surface to display life-size autostereoscopic live images of a person from a remote location.

46 Claims, 10 Drawing Sheets

U.S. PATENT DOCUMENTS

| | | |
|---|---|---|
| 5,278,596 A | 1/1994 | Machtig |
| 5,365,354 A | 11/1994 | Jannson et al. |
| 5,438,357 A | 8/1995 | McNelley |
| 5,473,469 A | 12/1995 | Magocs et al. |
| 5,528,425 A | 6/1996 | Beaver |
| 5,532,736 A | 7/1996 | Kuriki et al. |
| 5,541,769 A | 7/1996 | Ansley et al. |
| 5,550,754 A | 8/1996 | McNelley et al. |
| 5,572,248 A * | 11/1996 | Allen et al. ............... 348/14.1 |
| 5,573,325 A | 11/1996 | Lekowski |
| 5,609,939 A | 3/1997 | Petersen et al. |
| 5,619,254 A | 4/1997 | McNelley |
| 5,639,151 A | 6/1997 | McNelley et al. |
| 5,685,625 A | 11/1997 | Beaver |
| 5,777,665 A | 7/1998 | McNelley et al. |
| 5,782,547 A | 7/1998 | Machtig et al. |
| 5,801,758 A * | 9/1998 | Heirich ................... 348/14.16 |
| 5,837,346 A | 11/1998 | Langille et al. |
| 5,865,519 A | 2/1999 | Maass |
| 5,890,787 A | 4/1999 | McNelley et al. |
| 5,892,538 A | 4/1999 | Gibas |
| 5,923,469 A | 7/1999 | Machtig et al. |
| 5,953,052 A | 9/1999 | McNelley et al. |
| 6,023,369 A | 2/2000 | Goto |
| 6,042,233 A | 3/2000 | Mihashi et al. |
| 6,042,235 A * | 3/2000 | Machtig et al. ............... 353/28 |
| 6,044,226 A | 3/2000 | McWilliams |
| 6,104,424 A | 8/2000 | McNelley |
| 6,137,526 A * | 10/2000 | Kakii ..................... 348/14.16 |
| 6,157,733 A * | 12/2000 | Swain ....................... 382/154 |
| 6,243,130 B1 | 6/2001 | McNelley et al. |
| 6,290,359 B1 | 9/2001 | Shriver |
| 6,421,174 B1 | 7/2002 | Ooshima et al. |
| 6,600,600 B1 | 7/2003 | Chen |

FOREIGN PATENT DOCUMENTS

| | | |
|---|---|---|
| WO | WO 96/09722 | 3/1996 |

OTHER PUBLICATIONS

"Eye-To-Eye contact for Desk-To-Desk Video Conferencing" IBM Technical Disclosure Bulletin, vol. 35, No. 2, Jul. 1992, pp. 316-318.

Komatsu, T: Nakazawa, K.; Shiwa, S.; Ichinose, S.; "Multiscreen Display Method for Expanding Stereoscopic Viewing Space" SID 93 International Symposium Digest of Technical Papers, vol. 24, May 16, 1993, pp. 905-908.

Desilva, Liyanage C.; Tahara, Mitsuho; Aizawa, Kiyoharu; and Hatori, Mitsutoshi; "A Multiple Person Eye Contact (MPEC) Teleconferencing System" Proceedings of the International Conference of Image Processing (ICIP), Oct. 23, 1995, pp. 607-610.

* cited by examiner

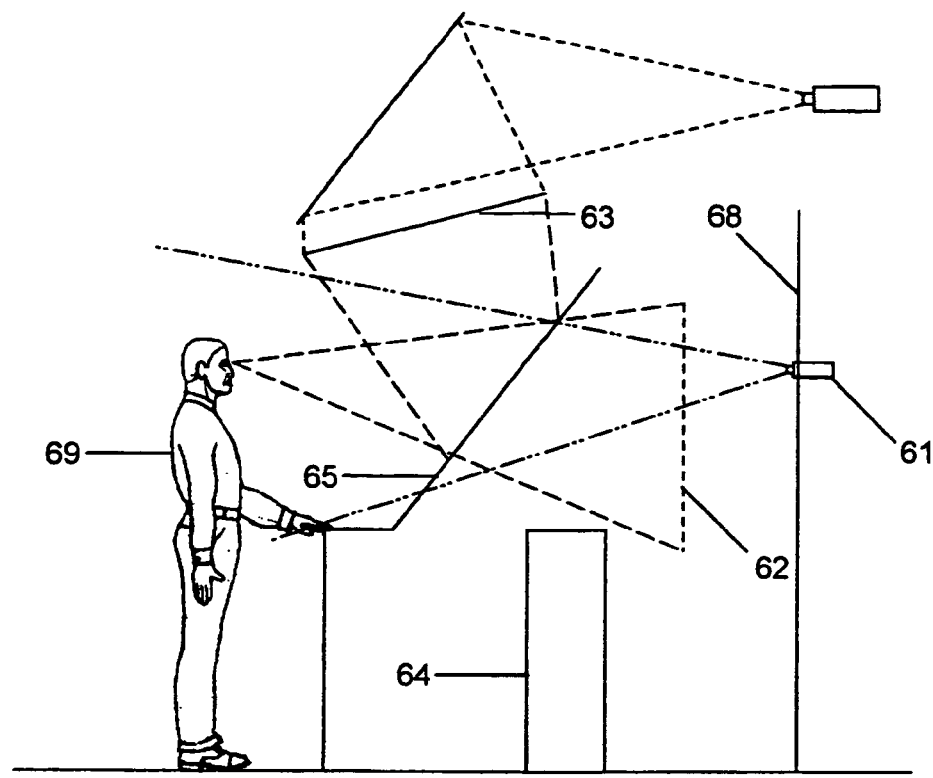
FIG. 14
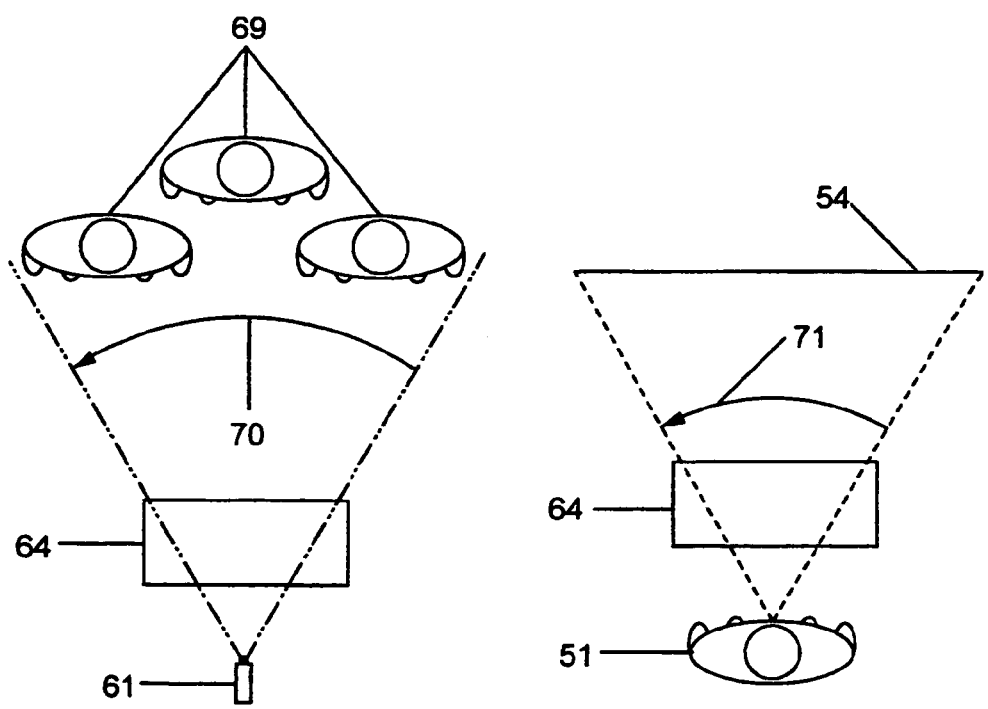
FIG. 15
FIG. 16

COMMUNICATIONS SYSTEM

This invention relates to a communications system which is particularly suitable for, but not limited to, video conferencing in which eye contact with a transmitted life-size image of a person superimposed into a three dimensional setting can be achieved.

Various forms of communication have been developed for transmitting moving images and audio between communicators. Commonly known as video conferencing, these systems use a network connection, such as ISDN, to transmit video between two locations. Most systems use a video monitor to display the people at the distant location and have a camera positioned on top of the monitor to capture an image of the users in the home location for transmission to the distant location.

In a common form of video conferencing the users communicate with the people pictured on the monitor. This type of communication is unnatural in that the users cannot look directly at each other during their communication. This is because the camera is located above the monitor instead of matching to the position of the eyes of the person displayed on the monitor. If the user in the home position looks at a person on the monitor, the user will be looking away from the camera. As a result the image displayed on the monitor in the distant location will show the person looking away from the camera. This makes it impossible to have natural eye to eye communication.

Several patents cover the basic principle of using a two way mirror to match a line of sight of a person displayed on a monitor or screen with reflected line of view by a camera. These inventions achieve eye contact between the user and the transmitted image of the person in the remote location. However, the transmitted person appears on a flat screen which does not give a sense of presence in the room.

With this present invention the user in the home location views the remote location displayed on a screen directly in front of him or her. This provides the user with a 'telepresence' by presenting a view of the remote location as if they were actually there. The people in the remote location will view the user in the home location as a life-size image superimposed into a position behind a lectern or seated at a table. The superimposed life-size image is positioned so that the camera is matched to the field of view for the telepresence of the user in the home location. Since the people in the remote location see a life-size image of a person who has a telepresence for natural human communication, we call this technique "teleportation".

This eye to eye contact with the teleported person makes it easier to establish a sense of presence which encourages more natural communication. Through this format people can be more expressive and draw upon human gestures and expressions to communicate emotions and feelings. Instead of having a video conference this invention creates a new form of communication that has been coined a "teleportation conference".

This invention provides a system for achieving eye to eye communication by matching the position of cameras with the relative position of the eyes of the images of the people displayed on screens.

Embodiments of the present invention reside in, but are not limited to, a communications system for linking participants at two separate locations, comprising: first and second locations each provided with at least one real time image capturing device, at least one image projecting device, an observation zone for occupation by a participant at that location and a two-way mirror through which images are viewed, the image capturing device(s) at each location being:

(a) arranged to view any participant occupying the home location observation zone directly or indirectly along a line of sight which passes through the two-way mirror, and (b) linked to the image projecting device at the other location whereby the captured image is transmitted from the home location to the remote location and projected at the remote location for viewing through the corresponding two-way mirror, and at least one location being provided with visual depth-cue means visible through the two-way mirror from the observation zone so that the remotely derived image of a remote participant is seen through the two-way mirror in superimposed relation within a three-dimensional setting afforded by said visual depth-cue means.

The visual depth means may be constituted by one or more suitably located objects or a further image display (e.g. an image or images projected onto a screen or backdrop) located beyond the two-way mirror so as to be prominently visible to the observer at that location.

The term "three dimensional setting" is to be understood in terms of an arrangement which gives the observer the impression of the remotely-derived image being positioned within a three-dimensional volume beyond the two-way mirror. Thus, I do not exclude the possibility that the three dimensional setting is implemented by positioning the remotely-derived image (which may be flat or stereoscopic) in a plane spaced, along the line of sight of the viewer, from one or more further planes at which a further image or images (e.g. scenery) is displayed, the further image(s) being flat or stereoscopic.

Various other aspects and features of the invention are disclosed in the claims appended hereto and in the description that follows.

The invention may comprise a home location connected by a network to one or more remote locations with each location having an arrangement of an image-capturing device in the form of a video camera, a two way mirror and an image display. The video camera can be any device that captures moving images of the user. The camera may output the moving images in a standard video format or a format optimised for a network, such as internet protocol for transmission over the internet. The two way mirror can be a semi-transparent element comprising for example a partially mirrored glass, plastic or film material or other form of beam-splitting arrangement. The two way mirror may be laminated with one or more sheets of glass or plastic to maintain a flat surface. The image display can be a rear projection screen, a front projection screen, a retroreflective surface or a large display screen, such as a plasma screen, LCD screen or monitor.

In one embodiment of the invention, at the location of the origination of the teleportation conference, the home location, a user seated at a table looks forward to see the life-size image of a person from another location called the remote location. A two way mirror positioned in front of the user is angled to reflect an image of a person displayed on an image display. So that the image as seen by the viewer at one location is not a mirror image of the participant at the remote location, it may be necessary to flip the image laterally by video processing or by mounting a small mirror in front of the camera lens.

The configurations can be arranged so that the two way mirror is angled down to reflect an image display positioned below or angled up to reflect an image display positioned above. The image display and the mirror are configured so that the reflected image of the person on the image display appears to be on the other side of a table or lectern. In a configuration with a table the teleported person may appear to be seated in a chair and the camera may be located in a high back with a camera facing towards the user to capture the image of the user in the home location. For a configuration with a lectern the camera may be located in a draped backdrop behind the lectern. In either configuration the position of the eyes of the teleported person is displayed in a position to match the line of sight as captured by the camera.

The visual person(s) to person(s) link between locations may be supplemented by a computer link between the locations. Thus, the user(s) may have a computer monitor positioned in front of him or her so that he or she could control computer programs containing content to be shared with the remote person(s). The computer in the home location may be networked by the Internet, telecommunications connection or private network with a compatible computer in the remote location. Through specialist software and a network connection the images displayed on the screen in the home location can be controlled to be displayed on a monitor in front of the remote person and/or on a screen to be viewed by an audience in the remote location.

In one embodiment of the invention the users in each location will be able to use a stylus to make notations on the screen which will be visualised on the computer screens in both the home and the remote locations. One application of the invention may, for instance, be for a teleportation meeting between a banker in a national centre and a customer in a branch of the bank whereas the banker would select relevant graphics and forms within a custom computer program. Through the teleportation visual display of face to face communication the banker and the customer would discuss the displayed graphic and financial material. Information that is of interest to the customer could be printed by a small printer next to the customer for taking away for further review and consideration. The banker could help the customer to fill in forms by typing in information or using the stylus to check appropriate boxes while maintaining a personal eye to eye communication to provide assurance and gauge responses. The completed form could be printed in the branch bank and signed by the customer for posting back to the national bank centre.

In another embodiment of the invention the person in the home location would be displayed at a lectern in a remote location. The visual content displayed on the computer screen in the home location would be networked to the remote location for display on a large screen that would be in clear view of an audience. In one application, the invention would be used for teaching, training or corporate presentations where the audience would be interested in both seeing the presenter and seeing the content of the presentation. With the use of a stylus the presenter would be able to make notations that would highlight content in a prepared presentation. The screen in front of the audience could be an "interactive board" that would have the feature of registering any notations made on the board as a computer input. The notations on the screen would be networked to the presenter's computer so that he or she could see a display of any input by the audience in the remote location.

In a large scale configuration of the invention a substantially full figure from head to toe is displayed at substantially life-size. The figure can be displayed in a theatre where the teleported person appears to be on the stage. The teleported person may be able to see a large screen display of the audience so that he/she can interact through natural conversation with members of the audience. In this way, dignitaries, performers, musicians, sports stars and celebrities could be brought into face to face contact with audiences around the world.

For theatrical productions it is possible to have a second projection means to project a backdrop behind the superimposed images of the teleported people. In this way it possible to have live performances with teleported people appearing to be in front of projected backdrops which could be transmitted from the remote locations or be real time computer generated virtual environments.

In the configuration of the invention for a teleportation conference, the user in the home location may for example see the three dimensional setting of a conference room through the two way mirror and an image of the distant user superimposed into a position behind the table in a plane that is in front of a chair. The chair and table serve to provide visual depth cues so that the image of the distant user is seen in a three dimensional setting. A camera on the user at each location views through the two way mirror to capture an image of the user. The video or computer image has the background dropped out to black so that the only image being displayed on the screen is the image of the user. This black background can be achieved by shooting the user against a black background; by using a chromakey technique to replace a colour, such as blue, with a black background or by using a retroreflective material with a key light positioned close to the camera lens.

The invention can be configured to have more than two locations participating in the teleportation conference with each location having separate image displays for each person transmitted from the remote locations. In these configurations a separate camera is used for each view of the user.

In another embodiment of the invention there are two cameras with an offset of approximately 65 mm to capture a stereoscopic image which is transmitted to the remote location or locations. The two cameras are positioned above the two way mirror so that their field of view covers a reflection of the user in the two way mirror. The exact location of the two cameras is determined by the position of the eyes of the user in the remote location. A head tracking system determines the exact position of the eyes of the user in the remote location and the co-ordinates are transmitted to the home location. In the home location the cameras are moved to the selected position above the mirror to match the relative position of the remote user behind the two way mirror.

In this configuration the screen comprises retroreflective material and the images are front projected. The two projectors use single lenses and the projectors are positioned so that the focal points of the reflected images match to the positions of the two eyes of the user. The co-ordinates produced by the head tracking device are used to position the projectors in the remote location. The projectors are held in a translation stage that moves to a position to be at the reflected focal point from the retroreflective surface. In this way the user will see an autostereoscopic image.

In the home location the user will see an autostereoscopic image of the users in the remote location. This configuration does pose a problem in that the field of view of the cameras will include the projectors seen through the two way mirror. In order to minimise the brightness of these projectors it is possible to use polarising filters on the projectors and a second set of polarising filters set at 90 degrees on the cameras.

Another method for solving this problem is to have shutters on both the cameras and the projectors that are synchronised to alternate between projecting the image of the remote location and capturing the image in the home location.

Another method for achieving stereoscopic images is to project two images obtained using two separate cameras at the remote location that are offset laterally to provide a stereoscopic pair with polarising filters set at 90 degrees to each other onto a rear projection screen that retains the polarity of light as it passes through the screen. While normal rear projection screen materials diffuse polarised light, the polarisation of light is retained by using clear screen material with a fresnel lens on one side and a lenticular array on the other. The stereoscopic pair of images projected on the high gain rear projection screen is reflected by the two way mirror and the resulting stereoscopic images may be viewed through 3D polarised glasses.

The same stereoscopic visual effect can be achieved by using glasses or goggles that use LCD shutters to alternate between left and right views of the participant from a pair of cameras in the other location. With this system the screen could be of a type that would diffuse polarised light. The shutter glasses could be used with a CRT monitor, LCD monitor, plasma screen or other type of electronic image display system that could alternate the display of the left and right images, the arrangement being such that the displayed images are reflected by the two way mirror so as to appear to be within the 3 dimensional setting located beyond the two way mirror.

A method for achieving stereoscopic effect without the use of polarising glasses or LCD goggles is to use a lenticular screen on a monitor which displays a set of offset views for reflection by the two way mirror so as to appear to be within the three dimensional setting. This method is ideal for autostereoscopic viewing from several positions simultaneously. The size of displays with this technique is governed by the size of high resolution monitors available.

With this stereoscopic display the person may be projected onto the screen with a black background. Their stereoscopic image will be reflected to appear within the three dimensional space in front of the viewer. In this manner the person and any objects captured by the cameras will appear to have true depth as they are seen in the three dimensional space. Unlike the single image that will appear to be within the single plane of the reflected image, the person in the stereoscopic image could appear to move closer and further away within the three dimensional space behind the two way mirror and could even appear to reach forward of the two way mirror.

A particularly advantageous feature of the invention is that a life-size image of a person in a remote location may be made to appear in a three dimensional setting that may include objects within the image area. It is then possible to assign functions to be performed when the image of the remote person intersects with the physical location of one of the objects, i.e. actions on the part of the user in the remote location may be correlated with physical objects in the three dimensional setting at the home location so as to give the impression of interaction of the remotely-captured image with the physical objects at the home location. As an example, a remote person could trigger a function by reaching to the location of a button within the image area. Since there is no physical presence of the remote person, the function could be triggered by a software application that would recognise the movement of a hand as it entered a zone dedicated to a predetermined function. In this way a remote person could perform functions in a manner similar to actually being in the remote location.

Another method for registering a function is for the person in the home location to make physical contact with an object in the home location. The physical contact will be registered as a set of measurable pressures and/or physical movements. These registered physical pressures and/or movements will be activated in the remote location on a similar object to mimic the action taken in the home location. This will result in a coordinated display of an image of the person in the remote location activating actual physical movement or physical change to objects in the three dimensional space. This effect can be very useful in training or demonstrations.

The interaction of a flat life-size image of a person with objects in the three dimensional space can work effectively if the objects are within the plane of the flat image. However, this interaction within the three dimensional space can be most effective with a stereoscopic image of a life-size person from a remote location.

Although the invention is disclosed above in relation to person to person visual communication at two locations, the invention includes within its scope a system in which there is at least one further location so arranged that a person at each location is able to communicate at least visually with a person at at least one, and preferably at each, other location The invention will now be described by way of example with reference to the accompanying drawings in which:

FIG. 14 shows the system in a configuration of an exhibition stand where group of standing people can view a superimposed image of a user from the home location.

FIG. 15 shows a top view of the system in the configuration for an exhibition stand where the camera angle of view captures an image of a group of people.

FIG. 16 shows the top view of the system at the home location where the user can see an image positioned at an angle of view that matches the angle of view of the camera in the remote location on the group of people looking into the exhibition stand.

Figure 1:
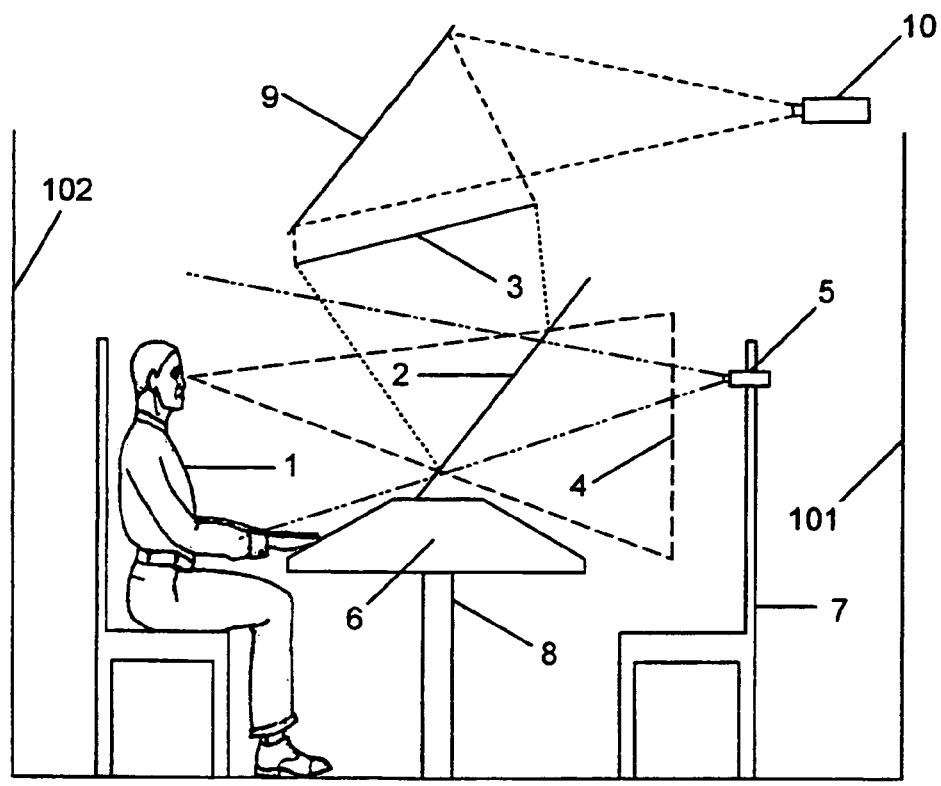
FIG. 1 shows one system in accordance with the invention with a user seated at a table with a two way mirror that reflects an image of a user in a remote location and provides a view through the mirror to a setting with a chair so that the image of the remote user is superimposed into the scene and a camera captures an image of the user through the two way mirror.

Referring to drawing FIG. 1 a user 1 is in the home location for a teleportation conference. The user 1 looks forward to see an image on a screen 3 that is reflected off a beam splitter in the form of a two way mirror 2. The two way mirror 2 and the screen 3 are aligned so that the reflected image is superimposed in a three dimensional setting behind table 8 at position 4 which appears to be in front of the chair 7 and background wall 101, the chair and table serving as visible depth cues for the observer. The rear projection screen 3 has an image projected from projector 10 that is reflected off mirror 9. A camera 5 captures an image of the user 1 through the two way mirror 2. In this and certain but not all other embodiments to be described below, the camera views the participant directly along a line of sight which passes through the two-way mirror and through the image 4. The user 1 is viewed against a background wall 102 which is either black, a colour for chromakey or a retroreflective material. The user 1 can input computer commands through a keyboard in a console 6 which also incorporates a standard monitor or touch screen monitor.

Figure 2:
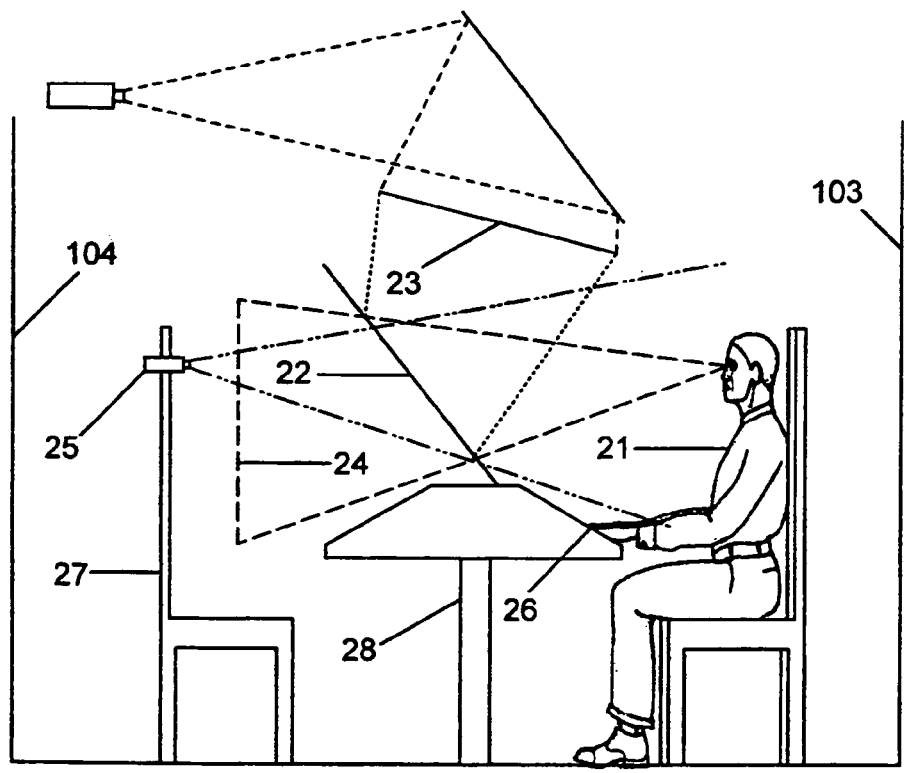
FIG. 2 shows the system in the configuration in the remote location with a mirror image of all of the same features of the home location.

In FIG. 2 a user in a remote location 21 looks through a two way mirror 22 to see a reflected image of screen 23 that appears to be positioned in a three dimensional setting behind table 28 at position 24 and in front of chair 27 and background wall 104. The image at position 24 is the user 1 in FIG. 1 as seen by camera 5. The user 21 can input information and control computer functions at console 26 that will be linked by a network to the console 6 at the home location represented in FIG. 1. A camera 25 captures an image through the two way mirror 22 of the user 21 so that it can be transmitted to the home location for display on screen 3 in FIG. 1. Again the table and chair serve as visual depth cues.

Figure 3:
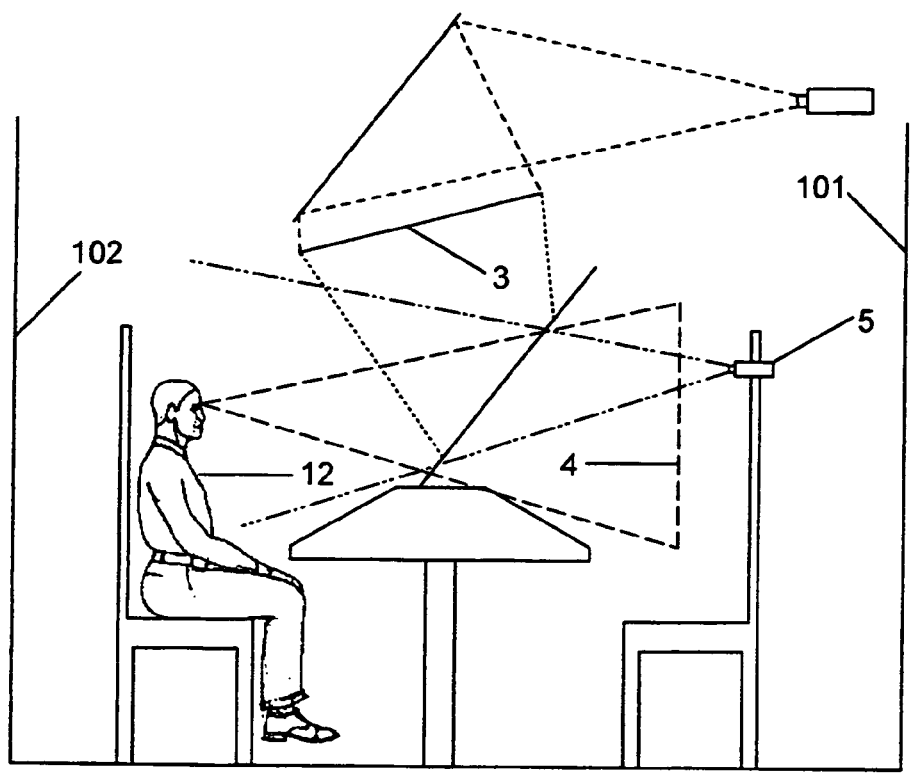
FIG. 3 shows the system with a shorter person at the home location.

FIG. 3 represents the home location with a different user 12 that is shorter than the original user 1 in FIG. 1.

Figure 4:
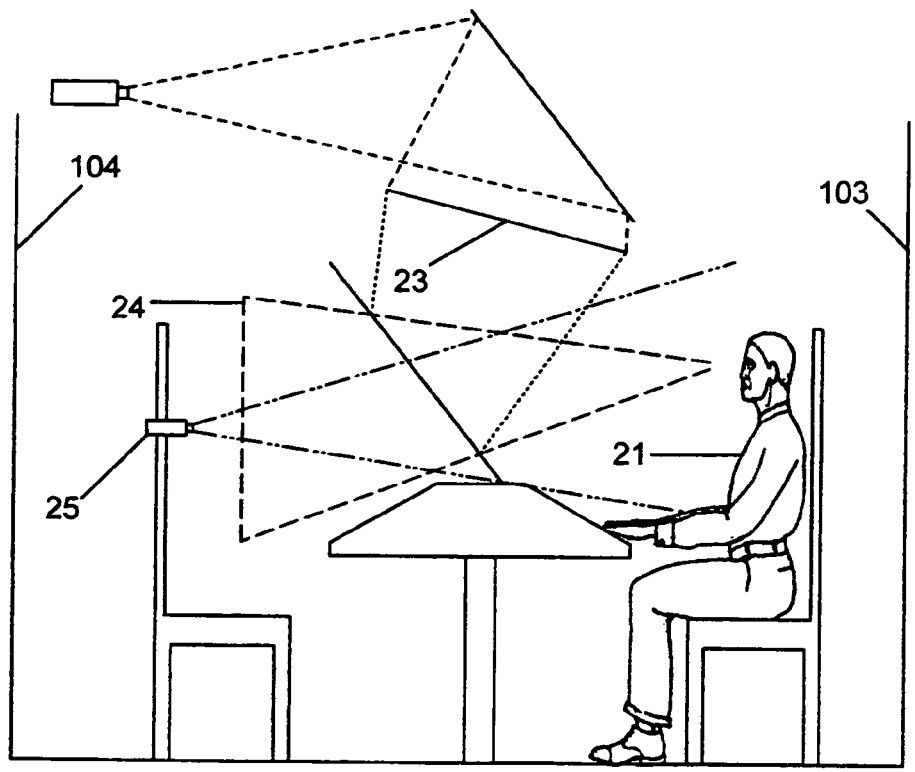
FIG. 4 shows the system in the configuration of the remote location with the camera on the user in a lower position in order to match the height of the eyes of the user in the home location.

FIG. 4 shows the remote location with the same user 21 as illustrated in FIG. 2. The camera 25 is lower than in FIG. 2 so that the height of the camera 25 matches the position of the eyes of the shorter user 12 in FIG. 3. The output of the camera 25 is transmitted over a network to the home location and displayed on screen 3 in FIG. 3 so that the user 12 will see the reflected image in the position 4 at an angle of view that matches the angle of view of the user 12.

Figure 5:
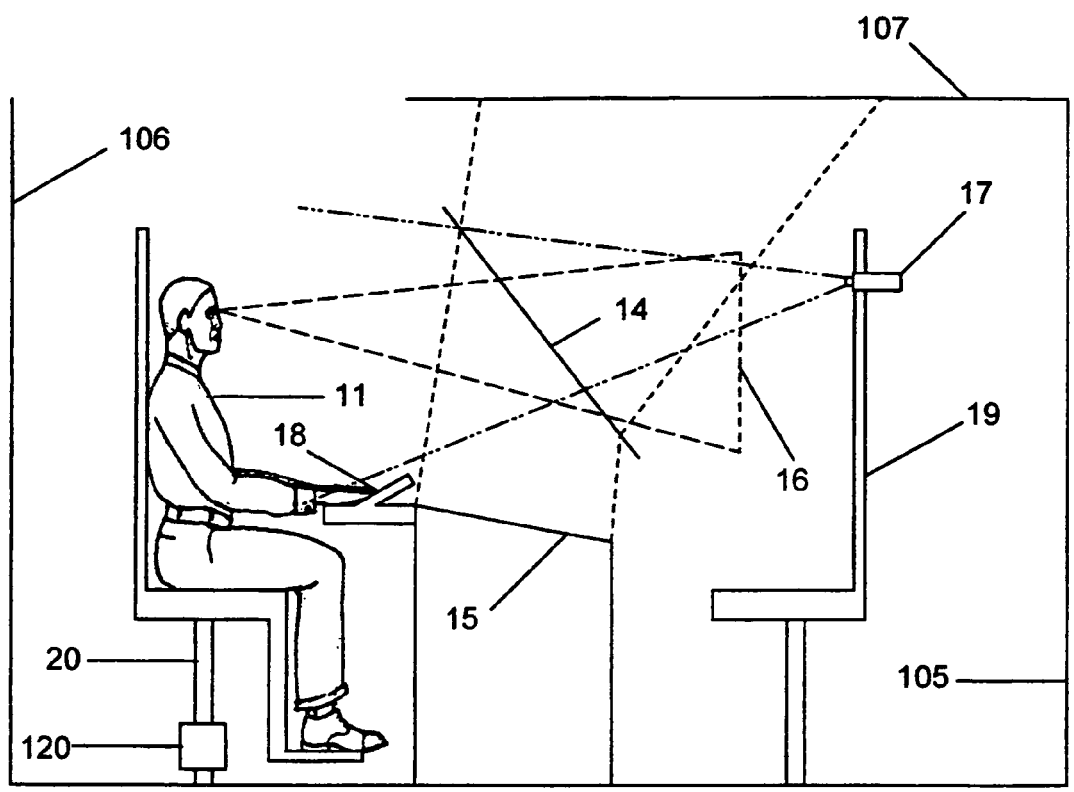
FIG. 5 shows the system in a configuration with the image display below the two way mirror and the superimposed image of the remote person positioned in a chair.

FIG. 5 shows a user 11 seated in a chair 20 that can have the height adjusted 120 to position of the eyes of the user at the correct placement for the camera 17. For the purposes of establishing the correct height of the person's eyes, the output of camera 17 is displayed on monitor 15 which is viewed as a superimposed image at 16. An alignment reference is displayed on the monitor 15 so the user can easily set the correct height. The camera sees the user 11, the chair 20 and the background 106. The chair 20 and the background 106 are black, a chromakey material or a retroreflective material so that the final image can be transmitted as solely the image of the user 11 against a black background. The camera 17 also sees a reflection of the ceiling 107, however the ceiling is black so that it does not register as an image with the camera 17. The user 11 looks forward to see a chair 19 and background wall 105 with a superimposed image 16 of a remote person displayed on a video display 15 which is reflected by a two way mirror 14. The user can share information with the remote person through a networked computer 18.

Figure 6:
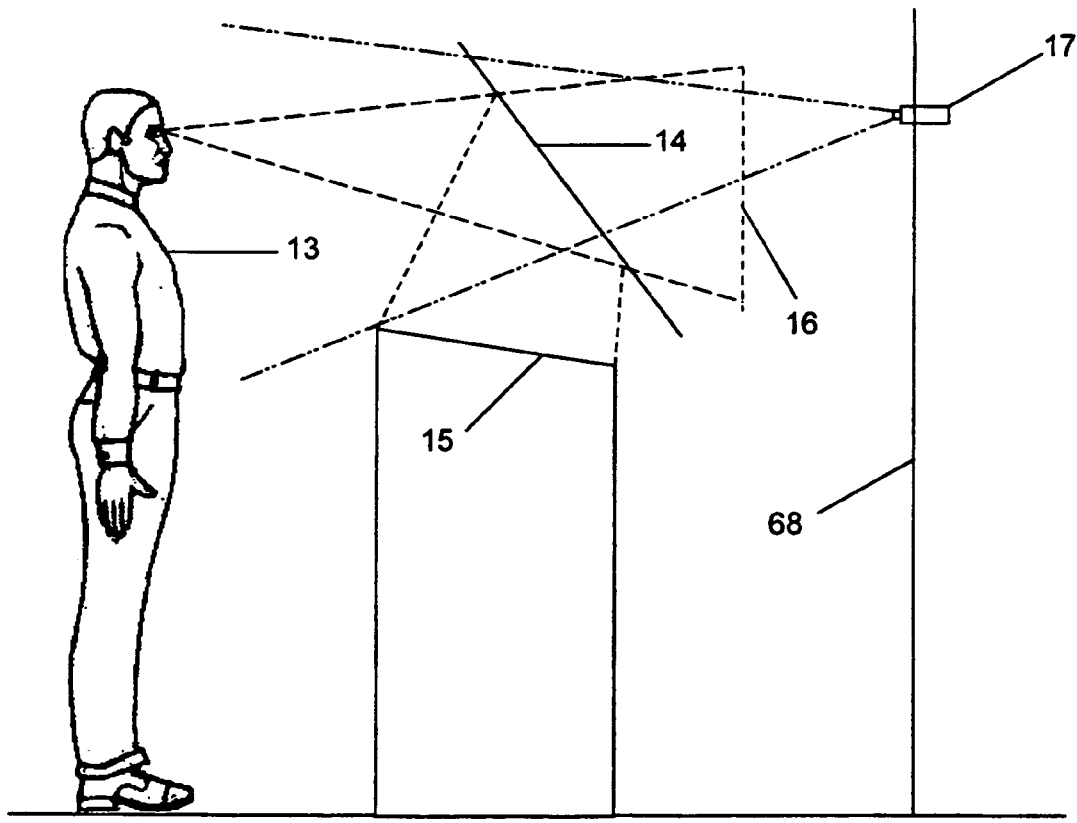
FIG. 6 shows the system with the image display housed in a lectern with the superimposed remote person in front of a curtain backdrop.

FIG. 6 shows a user 13 standing in front of a lectern with a video display 15 which reflects on a two way mirror 14 for showing a superimposed image 16 in a three dimensional setting with the lectern serving as visual depth cue means. A camera 17 is concealed in a draped background 68.

Figure 7:
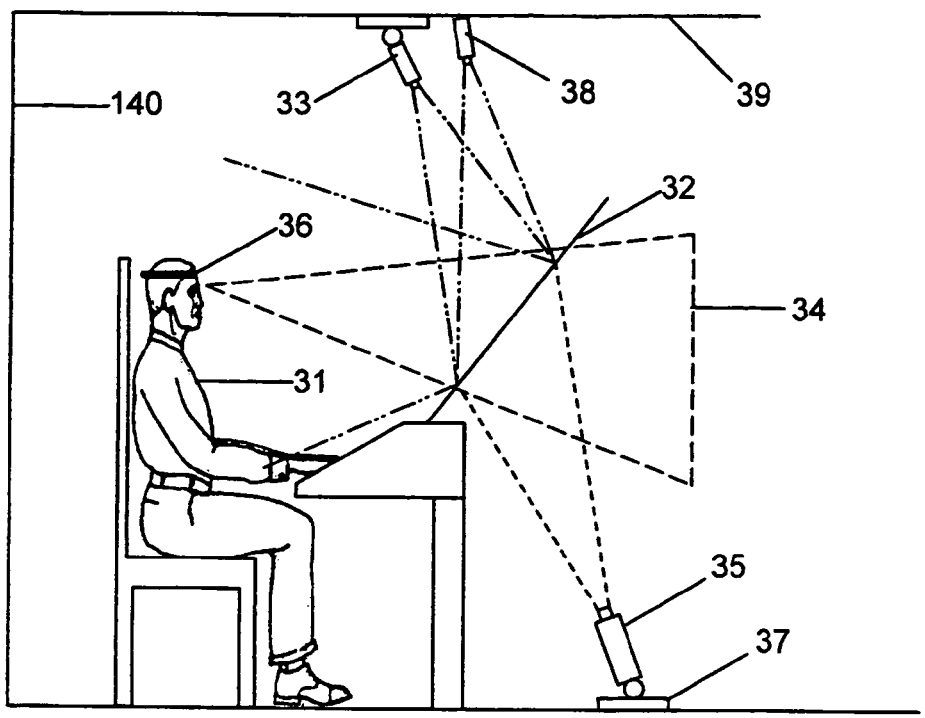
FIG. 7 shows an embodiment of the system used for autostereoscopic viewing of a person in a remote location with a pair of projectors projecting an image on a retroreflective surface and a pair of cameras capturing the reflected image of the user.

FIG. 7 shows a user 31 in a home location for the system in a configuration for an autostereoscopic teleportation conference. The user 31 looks forward through a two way mirror 32 to see a retroreflective screen 34. The user 31 also sees the ceiling 39 reflected off the two way mirror 32. Since the ceiling 39 is black it does not add any superimposed image onto the image displayed on the retroreflective material 34. A projection rig 35 holds a pair of projectors that have projection paths that have a convergence that is approximately 65 mm horizontally offset to approximate a typical interocular offset for a user. The rig with two projectors is positioned so that the projection reflects off the two way mirror 32 to the retroreflective screen. The light reflecting off the retroreflective screen passes through the two way mirror and is focussed onto the left and right eyes respectively of the user 31. A camera rig 33 holds two cameras so that the field of view for the two cameras are offset approximately 65 mm in order that they can capture stereoscopic pairs of images. The cameras are directed toward the two way mirror at an angle to capture a stereoscopic image of the user 31.

The user 31 wears a head tracking device 36 that is used to provide co-ordinates of the position of the eyes of the user 31. The projection rig 35 is held in position by a translation stage 37 that moves projection rig 35 into a position matching the relative position of the eyes of the user 31. Another method which may be used instead for tracking the position of the eyes of the users is through a stationary camera 38 which views the area of movement of the person and uses a computer to analyse the image to determine the exact location of their eyes for the positioning of the pair of projectors at both locations.

Figure 8:
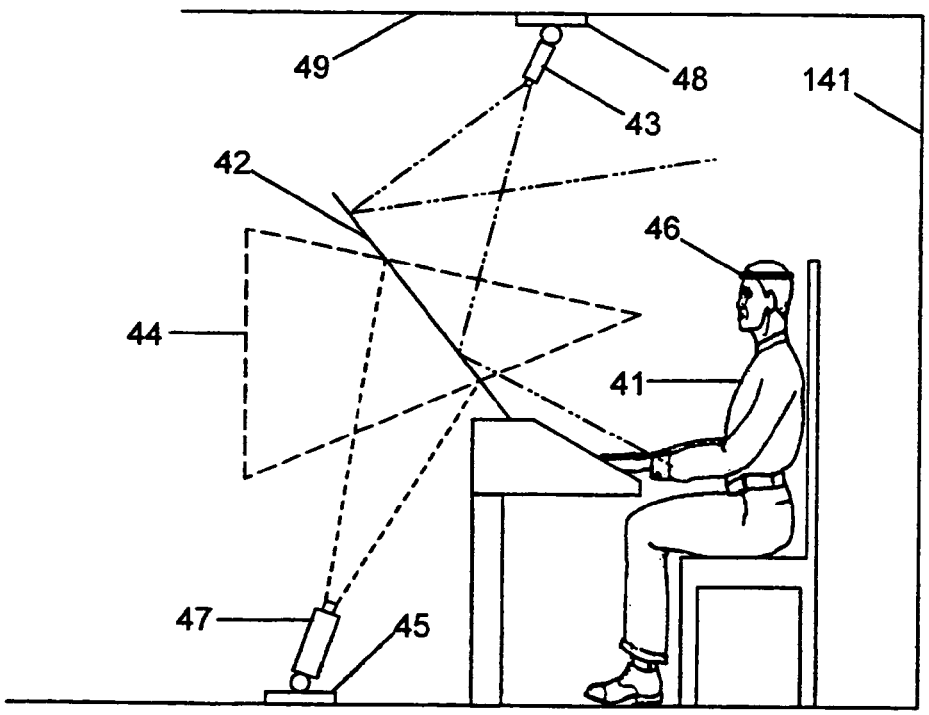
FIG. 8 shows the embodiment of the system in the autostereoscopic configuration for the remote location.

FIG. 8 shows a user 41 in a remote location for an autostereoscopic teleportation conference. The user 41 looks through the two way mirror to see the retroreflective screen 44. The projection rig 45 has two projectors that project the images captured by the camera rig 33 in FIG. 7. The camera rig 43 is positioned so that the field of view captures the image of the user 41 as seen as a reflection off the two way mirror 42. The images from the two cameras in the camera rig 43 are transmitted to the home location illustrated in FIG. 7 and projected by the pair of projectors in the rig 35 so that the user 31 can see the stereoscopic image on the retroreflective screen 34. It will be noted that the camera 33, 43 in the embodiment of FIGS. 7 and 8 sees the participant along a line of sight which indirectly passes through the two way mirror so that the eyes of the participant are effectively seen through the image 34.

Figure 9:
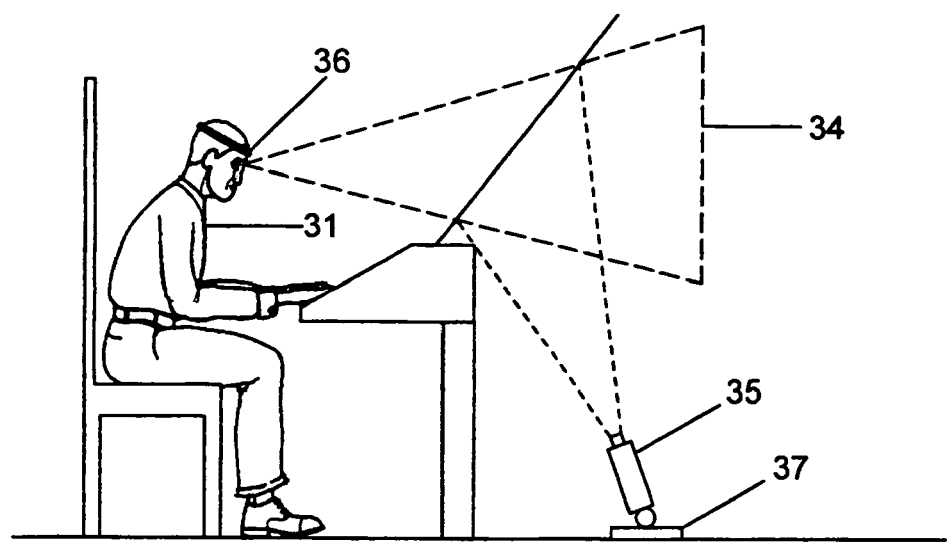
FIG. 9 shows the system with the user in the home location with a closer viewing position with an adjusted position of the projectors to match the relative distance from the retroreflective screen.

FIG. 9 shows the user 31 in the home location as he/she leans forward to get a closer view of the images from the remote location as displayed on the retroreflective screen 34. The head tracking device 36 determines the co-ordinates of the location of the eyes of the user 31. In response, the translation stage 37 moves the projection rig 35 closer to match the relative distance and angle of view of the user 31.

Figure 10:
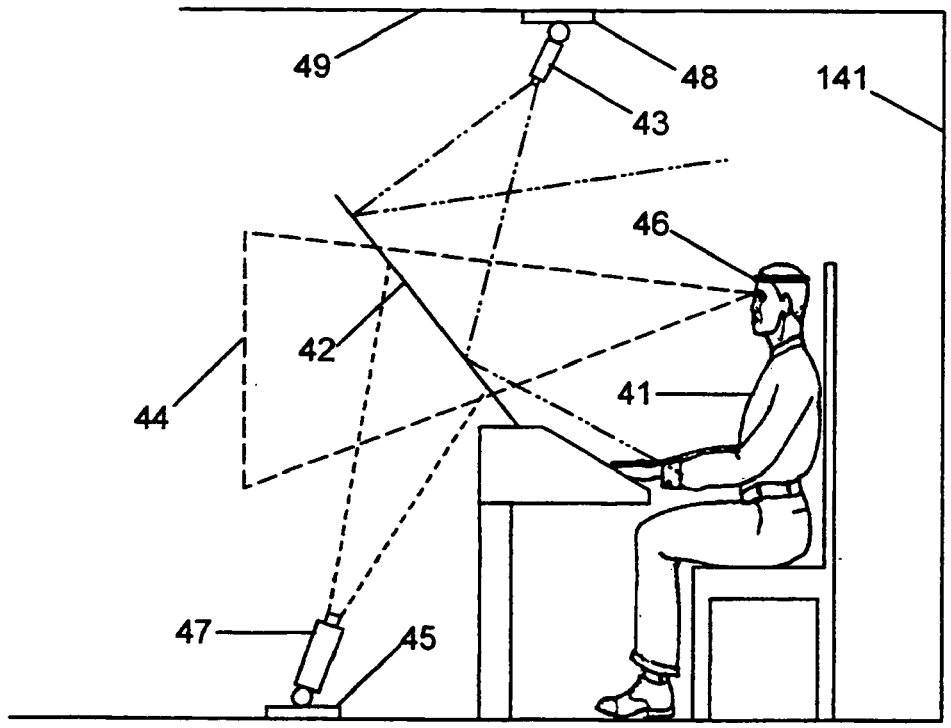
FIG. 10 shows the system in the remote location with the camera on the user moved in closer to match the relative distance of the user in the home position to the user in the remote location.

FIG. 10 shows the remote location with the translation stage 48 having moved the camera rig 43 in a closer position to match the relative position of the eyes of the user 31 in the home location shown in FIG. 9 as detected by the head tracking device at the home location.

Figure 11:
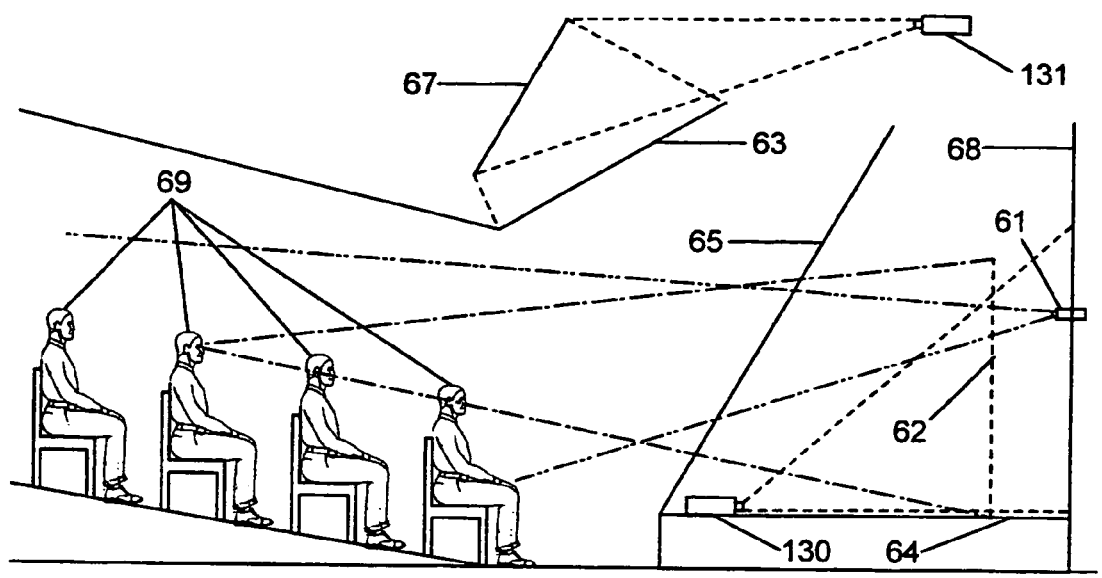
FIG. 11 shows an embodiment of the system where the person in the home location is a head to toe figure displayed on a screen positioned above the two way mirror so that it is superimposed onto a stage and is viewed by an audience.

FIG. 11 shows a configuration of the system for teleportation conferencing is with an audience at a remote location in the form of a theatre. From the observation zone in front of the stage 64, the audience 69 looks through the two way mirror 65 to see the stage 64 and the backdrop 68. A projector 66 projects an image on mirror 67 which reflects to be displayed on screen 63. The audience sees a reflection of screen 63 which appears superimposed into the stage setting at position 62 within the three dimensional stage setting. The camera 61 captures an image of the audience through the two way mirror 65. The stage floor 64 is black so that the reflection off the mirror 65 does not superimpose any light onto the image captured by camera 61. A second projector 130 projects onto the backdrop 68 to display an image providing a background setting for the superimposed image of the person 62 and also providing a visual depth cue.

Figure 12:
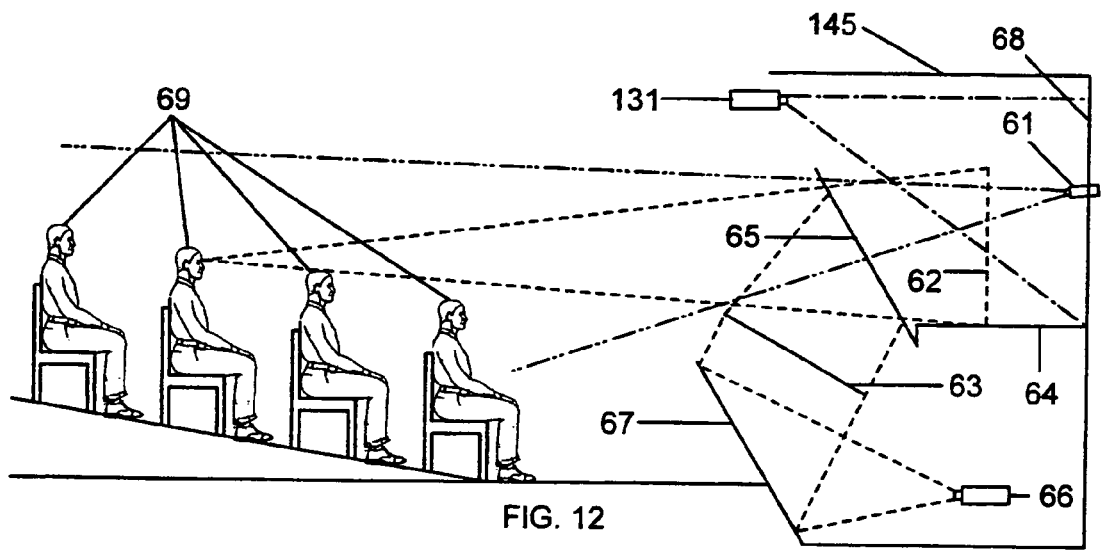
FIG. 12 shows another configuration of the system in a theatre setting where the two way mirror is angled down to reflect a screen below which has an image of a full head to toe figure.

FIG. 12 shows another configuration of the system with a two way mirror 65 angled down to reflect the image on the screen 63 so that it appears superimposed into the setting onto the stage 64 and in front of the backdrop 68 at position 62. In this configuration the second projector 131 is positioned above mirror 65 for projecting a background image on the backdrop 68.

Figure 13:
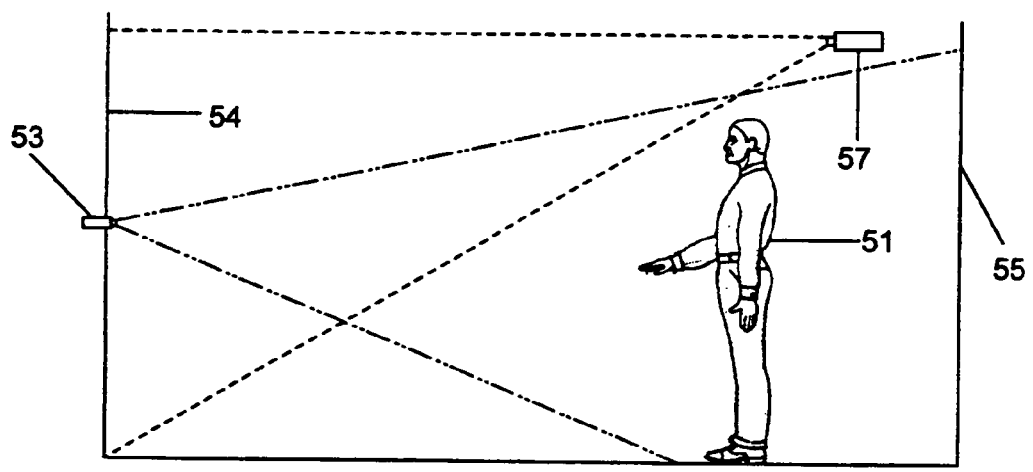
FIG. 13 shows a configuration of the system where a full height view of the user is captured by camera in the home location and the user has a view of an audience in a remote location displayed on a large screen.

FIG. 13 shows the home location for the teleportation conference with user 51 standing on a stage 55. A camera 53 looks through a small hole in screen 54 and has a field of view that captures an image of the full height of the user. The user looks forward at the same angle of view as the camera 61 in FIG. 11 so that the user sees the audience displayed on the screen 54 in the same orientation as the view of audience in the remote location.

FIG. 14 shows the system as an exhibition stand with a group of people 69 looking into the stand to see a user from the home location superimposed into the stand at position 62 behind lectern 64 and in front of a background 68. Camera 61 captures a view of the group of people 69 as seen through the two way mirror 65.

FIG. 15 shows a top view of the exhibition stand with the group of people 69 within the field of view 70 as seen by the camera 61.

FIG. 16 shows a top view of the home location with the user 51 looking at the monitor or screen 54 showing the field of view 71 at the same angle of view 70 as the camera 61 in FIG. 15 in the remote location.

Figure 17:
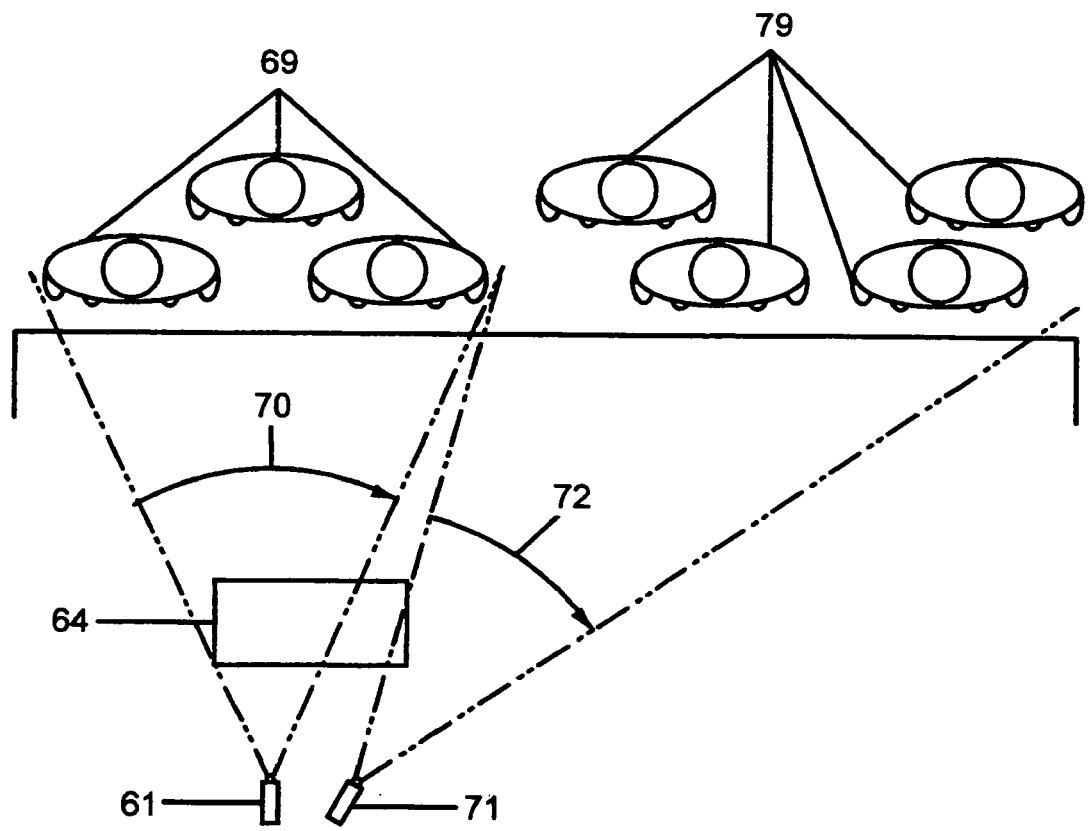
FIG. 17 shows a top view of the system in a configuration at an exhibition stand with two cameras to cover a wider area showing a group of people.

FIG. 17 shows a top view of the remote location at an exhibition stand with camera 61 capturing an image of a group of people 69 with a coverage of a set angle of view 70. A second camera 71 covers an angle of view 72 that captures images of more people 79.

Figure 18:
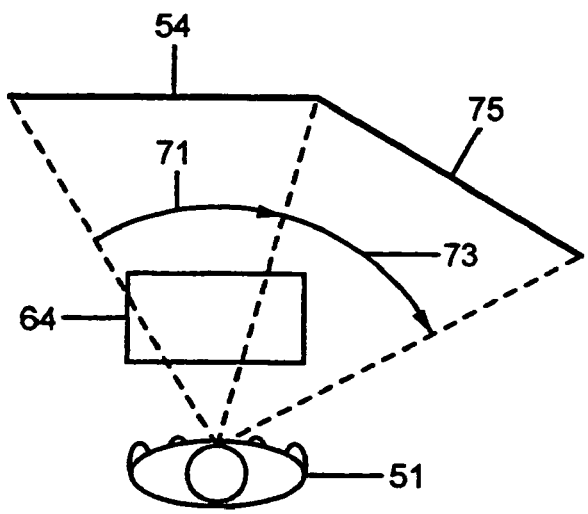
FIG. 18 shows a top view of the system in a configuration at the home location with two screens that match the cameras angles of view of the group at the remote location.

FIG. 18 shows a user 51 at the home location with a field of view 71 being displayed on a monitor or screen 54 that matches the angle of view 70 of camera 61 in the remote location in FIG. 17. A second field of view 73 that matches the angle of view 72 of the camera 71 the remote location in FIG. 17 is displayed on the monitor or screen 75.

Figure 19:
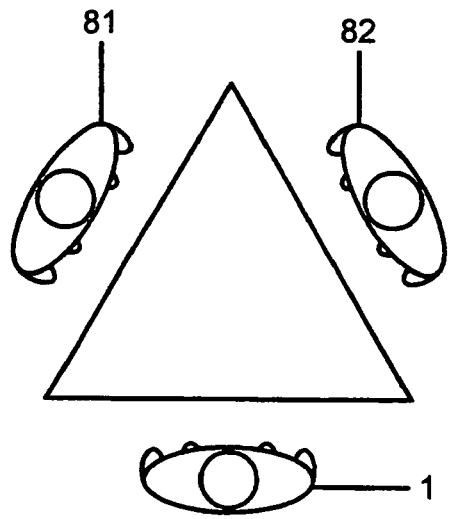
FIG. 19 shows a top view of triangular table that represents the layout for a teleportation conference for three people.

FIG. 19 shows a top view of the configuration of a teleportation conference with three people where user 1 sees an image of a user 81 in one remote location and user 82 from another remote location. In this configuration the users 81 and 82 will also be able to see and communicate with each other.

Figure 20:
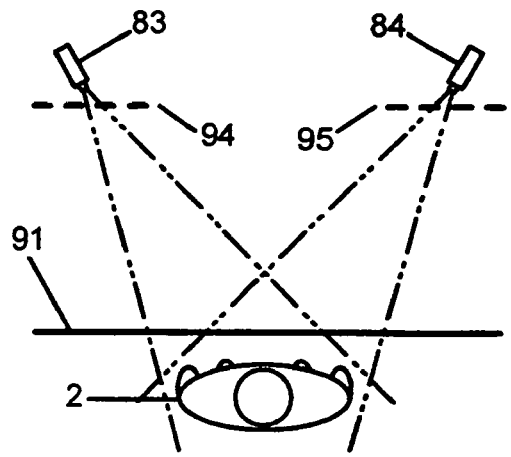
FIG. 20 shows the top view of the system in a configuration for the home location for a three way teleportation conference.

FIG. 20 shows the user 1 in the home location with a camera 83 to capture his/her image at the correct angle for viewing by user 81 and a camera 84 to capture his/her image for the correct viewing angle for user 82. A two way mirror 91 is used to superimpose images of users 81 and 82 in positions 94 and 95 respectively.

Figure 21:
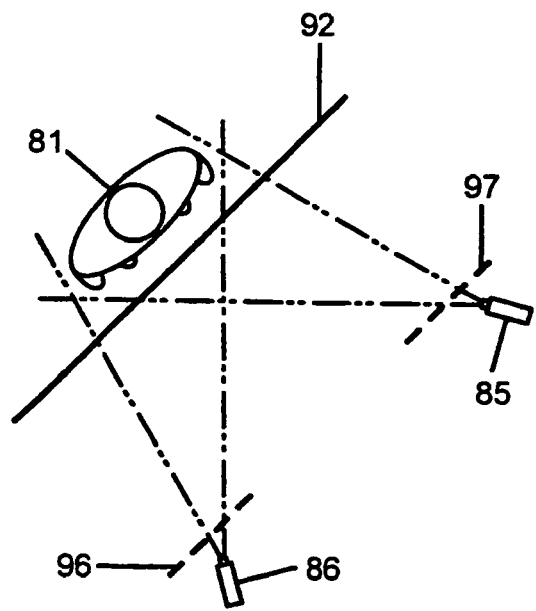
FIG. 21 shows the top view of the system in a configuration of the first remote location for a three way teleportation conference.

FIG. 21 shows the user 81 with camera 85 capturing his/her image from the correct angle for viewing by the remote user 82 and the camera 86 capturing his/her from the correct angle of view for the user 1 in the home location. A two way mirror 92 is used to superimpose images of users 1 and 82 into positions 96 and 97 respectively.

Figure 22:
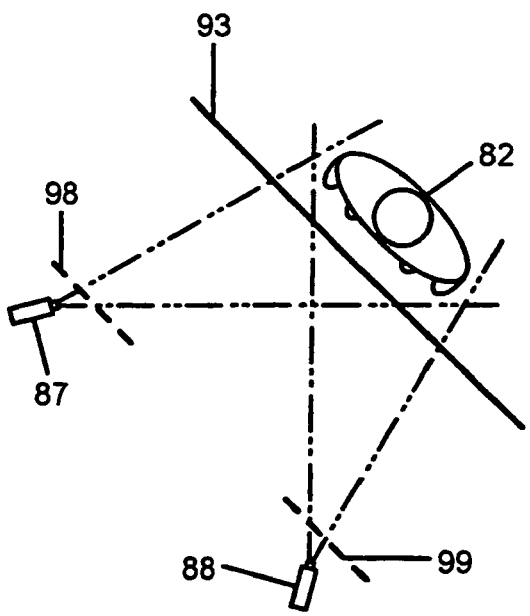
FIG. 22 shows the top view of the system in a configuration of the second remote location for a three way teleportation conference.

FIG. 22 shows the user 82 with camera 87 capturing his/her image at the correct angle for viewing for the user 81 and camera 88 capturing his/her image from the correct angle for the user 1 in the home position. A two way mirror 93 is used to superimpose images of users 81 and 1 into positions 98 and 99 respectively.

Figure 23:
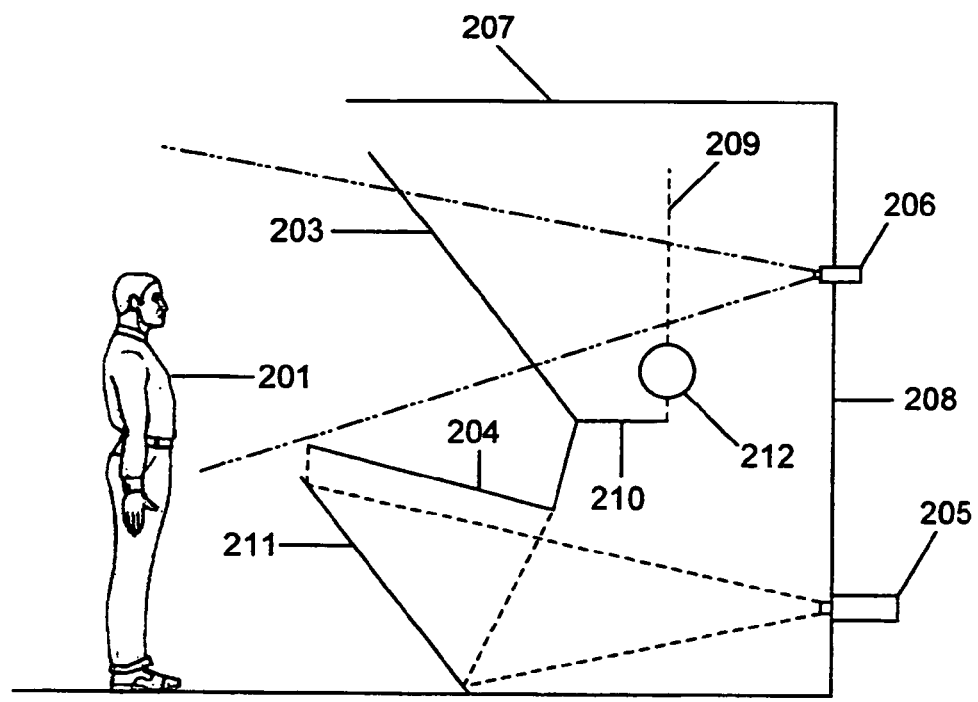
FIG. 23 shows a configuration with a rear projection screen for displaying an image of a remote person and a control object in the plane of the reflected image.

FIG. 23 shows a user 201 viewing screen 204 which is a reflected on to a two way mirror 203 so that the image of the remote user appears to be present in the plane depicted by reference numeral 209 and hence within the three dimensional setting beyond the mirror 203. Camera 206 views the user 201 through the image 209. Projector 205 projects the image of the remote user, the image being reflected on mirror 211 to be displayed on a rear projection screen 204.

A physical object 212 is placed in the plane of the apparent image 209. A physical component, such as a table top, is positioned to provide a visual barrier to match the bottom of the superimposed image.

Figure 24:
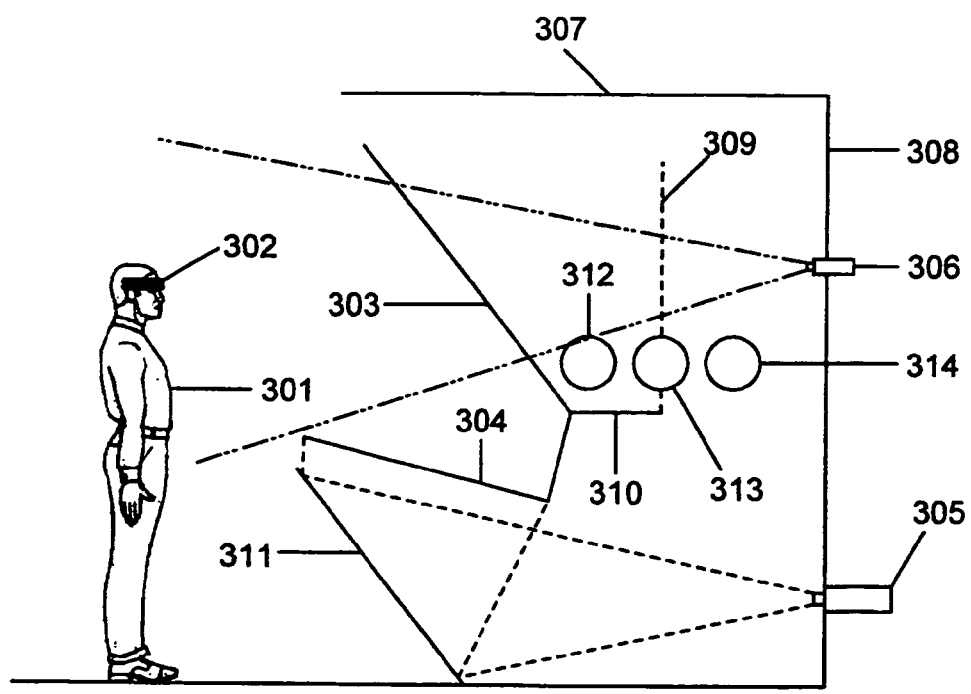
FIG. 24 shows a configuration with a rear projection screen displaying a stereoscopic image with a number of control objects at different depths.

FIG. 24 shows a user 301 wearing a pair of polarising glasses or LCD shutter glasses 302. A pair of projectors 305 project images that reflect on mirror 311 to be displayed on a rear projection screen 304. The pair of images projected on screen 304 may be polarised in planes at 90 degrees to each other or the two images may be projected alternately in rapid succession. The two way mirror 303 reflects the images on screen 304 so that they appear to be in the plane of 309 where, through persistence of vision, the images are superimposed as seen as a stereoscopic image. A number of objects 312, 313 and 314 are in the three dimensional space around the image plane of 309. Since the viewer is wearing polarising glasses or LCD shutter glasses as described hereinbefore, the user will see a stereoscopic image that will appear to be at a location that could be at the plane of the reflected image 309 or in a position in front or behind the plane 309.

From the foregoing, a number of features will be apparent including the following:

The invention may be embodied in an arrangement for displaying a substantially life-size live image of a person from a remote location in a home location while providing the person in the remote location with a telepresence of the home location by means of a video presentation system for displaying a life-size live image of a part or whole person;

a two way mirror through which a user views both the three dimensional setting and the superimposed video image of the person;

a video camera positioned in line with the eyes of the superimposed image of the person to secure eye-to-eye contact;

a network connection between the home location and the remote location for transmitting video images in both directions;

and the associated components of audio equipment, lighting, backgrounds and rigs to achieve the eye to eye contact between people in two different locations.

The background for the video image of the remote person may be black and the three dimensional setting viewed through the two way mirror may be illuminated so that the superimposed image of the person appears to be a life-size live person within the three dimensional setting without any visible indication of the borders of the video display screen or monitor.

The height of the camera or the height of the person to be viewed by the camera may be adjustable so that the eye level of the person matches the height of the camera in the corresponding location to achieve accurate telepresence of the remote location.

The image of one or more people may be displayed as a life-size head and shoulders live image or images superimposed into a position behind a console and directly in front of a chair to give the impression of the person actually sitting in the chair or behind a lectern and in front of a background drape, or behind a table, work surface or counter and in front of a background wall.

In some instances, substantially full head to toe image(s) of one or more people may be displayed as life-size live images superimposed onto a stage and in front of a background drape.

Where necessary, shutters or polarising filters may be used on the cameras and the projectors to avoid or minimise light projecting into the cameras by alternating the shutters.

The network connection may use standard video conference protocols for ISDN connections or internet protocol and the internet for the connections.

The invention claimed is:

1. A communications system, comprising:
   first and second locations, wherein the second location is remote and separate from the first location, each of the locations comprising:
   a real time image capturing device,
   an image projecting device,
   an observation zone for occupation by a participant, and
   a two-way mirror through which images are viewed;
   the image capturing device at the first location being:
      (a) arranged to view a participant occupying the observation zone at the first location directly or indirectly along a line of sight which passes through the two-way mirror at the first location, and
      (b) linked to the image projecting device at the second location whereby a captured image is transmitted from the first location to the second location and projected at the second location for viewing through the two-way mirror at the second location; and
   the first location comprising a visual depth cue physically located on an opposite side of the two-way mirror relative to the observation zone, the visual depth cue being in the form of one or more three dimensional physical objects physically located behind the two-way mirror and visible through the two-way mirror from the observation zone so that an image generated at the second location of a participant at the second location is seen through the two-way mirror at the first location in superimposed relation within a three dimensional setting afforded by the visual depth cue.

2. A system as claimed in claim 1 in which the one or more physical objects are visually located at positions forwardly and/or rearwardly of a visual position of the image generated at the second location when the image is being projected at the first location, as viewed from the observation zone at the first location.

3. A system as claimed in claim 1 in which the setting comprises a chair, the back of the chair being visually located rearwardly of a visual position of the image generated at the second location when the image is being projected at the first location, as viewed from the observation zone at the first location.

4. A system as claimed in claim 1 in which the setting comprises furniture selected from a group consisting of a desk, a table, a counter, and a console visually located forwardly of a visual position of the image generated at the second location when the image is being projected at the first location, as viewed from the observation zone at the first location.

5. A system as claimed in claim 1 in which the setting comprises a lectern visually located forwardly of a visual position of the image generated at the second location when the image is being projected at the first location, as viewed from the observation zone at the first location.

6. A system as claimed in claim 1 in which the setting comprises a stage.

7. A system as claimed in claim 6 in which a substantially full height image of a participant at the second location is projected for viewing against the stage setting at the first location.

8. A system as claimed in claim 7 in which the substantially full height image of the participant at the second location is visually positioned at a location intermediate of forward and rearward extremities of the stage setting.

9. A system as claimed in claim 6 in which the stage setting includes a background located rearwardly of a visual position of the image generated at the second location when the image is being projected at the first location, as viewed from the observation zone at the first location.

10. A system as claimed in claim 1, in which the setting comprises a background located rearwardly of a visual position of the image generated at the second location when the image is being projected at the first location, as viewed from the observation zone at the first location, and means being provided for producing an image on the background for viewing through the two-way mirror.

11. A system as claimed in claim 1, in which the image generated at the second location is projected so that, from the observation zone at the first location, it represents the remote participant at the second location as a substantially life-size image in relation to the setting.

12. A system as claimed in claim 1 including means for illuminating the one or more physical objects constituting the visual depth cue.

13. A system as claimed in claim 1, in which the image generated at the second location of a participant at the second location comprises a background which is substantially non-visible when viewed through the two-way mirror at the first location by a participant at the first location.

14. A system as claimed in claim 1, in which the two-way mirror is inclined relative to the line of sight of a participant stationed in the observation zone.

15. A system as claimed in claim 14 in which the two-way mirror is inclined about a horizontal axis.

16. A system as claimed in claim 15 in which a remotely-captured image is incident on the two-way mirror from a location below the two-way mirror.

17. A system as claimed in claim 15 in which a remotely-captured image is incident on the two-way mirror from a location above the two-way mirror.

18. A system as claimed in claim 1 including means for adjusting at least one of, the image-capturing device and a participant in the observation zone, so that the cye-level of the participant is substantially aligned with the line of sight of the image-capturing device viewing the participant.

19. A system as claimed in claim 1, in which remotely-captured images are displayed so as to create a stereoscopic visual effect when viewed from the observation zone.

20. A system as claimed in claim 19 in which the remotely-captured images are processed using light polarising elements to form pairs of images having different polarisations so that a stereoscopic image of a participant is seen when viewed from the observation zone using polarised glasses, whereby the images are viewed at the observation zone using a viewer synchronised with the display of the alternating images.

21. A system as claimed in claim 19 in which the stereoscopic visual effect is produced by alternating between images of a participant captured from different viewpoints.

22. A system as claimed in claim 1, in which at least one of the locations is provided with at least two image-capturing devices for viewing the participant(s) from different angles and in which at least one of the locations is provided with at least two image-projecting devices linked to the image-capturing devices.

23. A system as claimed in claim 22 in which remotely-captured images from the second location are displayed so as to create a stereoscopic effect when viewed from the observation zone at the first location.

24. A system as claimed in claim 22 in which remotely-captured images are projected onto a retroreflective screen located at the opposite side of the two-way mirror relative to the observation zone whereby the remotely-captured images from the second location are viewed in retroreflection at the observation zone of the first location.

25. A system as claimed in claim 1 including means for tracking the eye position of a participant in the observation zone and means for adjusting the image-projecting device in dependence upon such tracked positioning.

26. A system as claimed in claim 25 in which the tracking means includes an item of headwear to be worn by the participant in use of the system.

27. A system as claimed in claim 25 in which the tracking means includes camera means for observing the participant and means for analysing the images captured thereby to determine eye positioning.

28. A system as claimed in claim 1 including means for correlating actions of a participant at the second location with the one or more physical objects in the first location three dimensional setting so as to produce the impression of interaction of the image observed at the first location with the one or more physical objects.

29. A system as claimed in claim 1 further comprising a voice communication link between the first and second locations.

30. A system as claimed in claim 1 further comprising a data link between the first and second locations.

31. A system as claimed in claim 1, in which, in addition to the first and second locations, there is at least one further location so arranged that a person at each of the locations is able to communicate at least visually with a person at one or more of the other locations.

32. A communications system comprising:
   a first location comprising:
      a real time image capturing device, and
      an observation zone for occupation by one or more participants, the image-capturing device being arranged to view the observation zone;
   a second location that is separate and remote relative to the first location, the second location comprising:
      an image projecting device linked to the image-capturing device at the first location,
      an observation zone for occupation by one or more participants at the second location,
      a three dimensional setting with a visual depth cue in the form of one or more three dimensional physical objects physically located so as to be directly viewable from the observation zone of the second location, and a two-way mirror interposed between the observation zone of the second location and the three dimensional setting,
   the system being arranged such that an image captured at the first location is transmitted from the first location to the second location and is projected at the second location for viewing of the participant(s) at the first location through the two-way mirror in superimposed relation with the three dimensional setting.

33. A system as claimed in claim 32 in which a substantially full height image of the participant(s) at the first location is projected for viewing within the three dimensional setting of the second location.

34. A system as claimed in claim 33 in which the setting comprises a stage and means for displaying a further image constituting a visual depth cue means.

35. A system as claimed in claim 32 further comprising a voice communication link between the first and second locations.

36. A system as claimed in claim 32, in which a visual person(s) to person(s) link between the locations is supplemented by a computer link between the locations.

37. A system as claimed in claim 32, in which, in addition to the first and second locations, there is at least one further location so arranged that a person at each of the locations is able to communicate at least visually with a person at one or more of the other locations.

38. A viewing arrangement for use in the communications system as claimed in claim 32, the arrangement being such that a captured image of the one or more participants at the first location is transmitted from the first location to the image projecting device of the second location and is projected for viewing at the second location through the two-way mirror in superimposed relation with the three dimensional setting at the second location.

39. A communications system comprising:
at least one image projecting device capable of being linked to an image-capturing device at a remote location,
an observation zone for occupation by one or more participants,
a three dimensional setting with a three dimensional visual depth cue physically located so as to be directly viewable from the observation zone, and
a two-way mirror interposed between the observation zone and the three dimensional setting, the system being arranged such that remotely-captured images are projected onto a retreflective screen located at an opposite side of the two-way mirror relative to the observation zone whereby the remotely-captured images are viewed in retroreflection at the observation zone.

40. A communications system comprising:
an image projecting device capable of being linked to an image-capturing device at a remote location,
an observation zone for occupation by one or more participants,
a three dimensional setting with a three dimensional visual depth cue physically located so as to be directly viewable from the observation zone,
a two-way mirror interposed between the observation zone and the three dimensional setting,
means for tracking an eye position of a participant in the observation zone, and means for adjusting the image-projecting device in dependence upon tracked eye positioning by the tracking means.

41. A system as claimed in claim 40 in which the tacking means includes an item of headwear to be worn by the tracked participant in use of the system.

42. A system as claimed in claim 40 in which the tracking means includes a camera for observing the tracked participant and means for analysing images captured thereby to determine eye positioning.

43. A communications system, comprising:
first and second locations, wherein the second location is remote and separate from the first location, each of the locations comprising:
a real time image capturing device,
an image projecting device,
an observation zone for occupation by a participant, and
a two-way mirror through which images are viewed;
the image capturing device at the first location being:
(a) arranged to view a participant occupying the observation zone at the first location directly or indirectly along a line of sight which passes through the two-way mirror at the first location, and
(b) linked to the image projecting device at the second location whereby a captured image is transmitted from the first location to the second location and projected at the second location for viewing through the two-way mirror at the second location; and
the second location comprising a visual depth cue physically located on an opposite side of the two-way mirror relative to the observation zone, the visual depth cue being in the form of one or more three dimensional physical objects physically located so as to be directly visible through the two-way mirror from the observation zone so that an image generated at the first location of a participant at the first location is seen through the two-way mirror at the second location in superimposed relation within a three dimensional setting afforded by the visual depth cue, and
the second location being arranged such that the remotely-captured images from the first location are projected onto a retroreflective screen located at the opposite side of the two-way mirror relative to the observation zone whereby the remotely-captured images from the first location are viewed in retroreflection at the observation zone at the second location.

44. A communications system, comprising:
first and second locations, wherein the second location is remote and separate from the first location, each of the locations comprising:
a real time image capturing device,
an image projecting device,
an observation zone for occupation by a participant, and
a two-way mirror through which images are viewed;
the image capturing device at the first location being:
(a) arranged to view a participant occupying the observation zone at the first location directly or indirectly along a line of sight which passes through the two-way mirror at the first location, and
(b) linked to the image projecting device at the second location whereby a captured image is transmitted from the first location to the second location and projected at the second location for viewing through the two-way mirror at the second location; and
the second location comprising a visual depth cue physically located on an opposite side of the two-way mirror relative to the observation zone, the visual depth cue being in the form of one or more three dimensional physical objects physically located so as to be directly visible through the two-way mirror from the observation zone so that an image generated at the first location of a participant at the first location is seen through the two-way mirror at the second location in superimposed relation within a three dimensional setting afforded by the visual depth cue, and
means being provided for tracking an eye position of a participant in the observation zone and means for adjusting the image-projecting device in dependence upon such tracked positioning.

45. A system as claimed in claim 44 in which the tracking means includes an item of headwear to be worn by the tracked participant in use of the system.

46. A system as claimed in claim 44 in which the tracking means includes a camera for observing the tracked participant and means for analysing the images captured thereby to determine eye positioning, the second location being arranged such that the remotely-captured images from the first location are displayed so as to create a stereoscopic effect when viewed from the observation zone of the second location.

* * * * *